United States Patent
Higgins et al.

(10) Patent No.: US 9,947,170 B2
(45) Date of Patent: Apr. 17, 2018

(54) TIME SYNCHRONIZATION OF GAMING MACHINES

(71) Applicant: IGT, Las Vegas, NV (US)

(72) Inventors: Kevin M. Higgins, Reno, NV (US); Dwayne R. Nelson, Las Vegas, NV (US); Steven G. LeMay, Reno, NV (US); Derrick Price, Las Vegas, NV (US)

(73) Assignee: IGT, Las Vegas, NV (US)

( * ) Notice: Subject to any disclaimer, the term of this patent is extended or adjusted under 35 U.S.C. 154(b) by 212 days.

(21) Appl. No.: 14/867,108

(22) Filed: Sep. 28, 2015

(65) Prior Publication Data

US 2017/0092040 A1    Mar. 30, 2017

(51) Int. Cl.
*G07F 17/32* (2006.01)
*G06F 3/16* (2006.01)

(52) U.S. Cl.
CPC .......... *G07F 17/3211* (2013.01); *G06F 3/16* (2013.01); *G07F 17/3225* (2013.01); *G07F 17/3244* (2013.01); *G07F 17/3269* (2013.01)

(58) Field of Classification Search
CPC ............. G07F 17/3211; G07F 17/3225; G07F 17/3244; G07F 17/3269; G06F 3/16
See application file for complete search history.

(56) References Cited

U.S. PATENT DOCUMENTS

| | | |
|---|---|---|
| 3,831,172 A | 8/1974 | Olliges et al. |
| 4,300,225 A | 11/1981 | Lambl |
| 4,314,236 A | 2/1982 | Mayer et al. |
| 4,339,798 A | 7/1982 | Hedges et al. |
| 4,344,345 A | 8/1982 | Sano |
| 4,363,482 A | 12/1982 | Goldfarb |
| RE31,441 E | 11/1983 | Nutting et al. |
| 4,496,149 A | 1/1985 | Schwartzberg |
| 4,582,324 A | 4/1986 | Koza et al. |
| 4,618,150 A | 10/1986 | Kimura |
| 4,624,459 A | 11/1986 | Kaufman |
| 4,660,107 A | 4/1987 | Chippendale, Jr. |
| 4,695,053 A | 9/1987 | Vazquez, Jr. et al. |
| 4,712,189 A | 12/1987 | Mohri |
| 4,732,386 A | 3/1988 | Rayfiel |
| 4,733,593 A | 3/1988 | Rothbart |
| 4,791,558 A | 12/1988 | Chaitin et al. |
| 4,876,937 A | 10/1989 | Suzuki |
| 4,974,483 A | 12/1990 | Luzzatto |
| 4,974,857 A | 12/1990 | Beall et al. |
| 5,096,195 A | 3/1992 | Gimmon |

(Continued)

FOREIGN PATENT DOCUMENTS

| | | |
|---|---|---|
| GB | 2 201 279 | 8/1988 |
| JP | 11197292 | 12/1997 |

(Continued)

*Primary Examiner* — Werner Garner
(74) *Attorney, Agent, or Firm* — Neal, Gerber & Eisenberg LLP (57) ABSTRACT

Banked EGM light and sound shows which reduce the probability of appearing unsynchronized are described herein. A modified client time protocol on each EGM stores an offset from a time reference source. The time offset is used to schedule banked light and sound shows so that the performance of each EGM is synchronized, without requiring the actual clocks of the EGMs to be synchronized.

13 Claims, 5 Drawing Sheets

(56) References Cited

U.S. PATENT DOCUMENTS

| | | |
|---|---|---|
| 5,119,465 A | 6/1992 | Jack |
| 5,179,517 A | 1/1993 | Sarbin et al. |
| 5,221,801 A | 6/1993 | Bruti et al. |
| 5,223,828 A | 6/1993 | McKiel, Jr. |
| 5,242,163 A | 9/1993 | Fulton |
| 5,258,574 A | 11/1993 | Kawano |
| 5,266,736 A | 11/1993 | Saito |
| 5,275,400 A | 1/1994 | Weingardt et al. |
| 5,287,102 A | 2/1994 | McKiel, Jr. |
| 5,331,112 A | 7/1994 | Sato et al. |
| 5,342,047 A | 8/1994 | Heidel et al. |
| 5,371,345 A | 12/1994 | LeStrange et al. |
| 5,390,938 A | 2/1995 | Takeya |
| 5,393,061 A | 2/1995 | Manship et al. |
| 5,393,070 A | 2/1995 | Best |
| 5,429,507 A | 7/1995 | Kaplan |
| 5,430,835 A | 7/1995 | Williams et al. |
| 5,446,902 A | 8/1995 | Islam |
| 5,449,173 A | 9/1995 | Thomas et al. |
| 5,469,511 A | 11/1995 | Lewis et al. |
| 5,470,233 A | 11/1995 | Fruchterman et al. |
| 5,472,197 A | 12/1995 | Gwiasda et al. |
| 5,508,699 A | 4/1996 | Silverman |
| 5,515,764 A | 5/1996 | Rosen |
| 5,577,253 A | 11/1996 | Blickstein |
| 5,606,144 A | 2/1997 | Dabby |
| 5,625,845 A | 4/1997 | Allran |
| 5,668,996 A | 9/1997 | Radinsky |
| 5,695,188 A | 12/1997 | Ishibashi |
| 5,697,843 A | 12/1997 | Manship et al. |
| 5,703,310 A | 12/1997 | Kurakake et al. |
| 5,707,286 A | 1/1998 | Carlson |
| 5,715,459 A | 2/1998 | Celi |
| 5,745,761 A | 4/1998 | Celi |
| 5,745,762 A | 4/1998 | Celi |
| 5,758,875 A | 6/1998 | Giacalone, Jr. |
| 5,762,552 A | 6/1998 | Vuong et al. |
| 5,766,074 A | 6/1998 | Cannon et al. |
| 5,772,509 A | 6/1998 | Weiss |
| 5,778,231 A | 7/1998 | Van Hoff |
| 5,792,972 A | 8/1998 | Houston |
| 5,802,364 A | 9/1998 | Senator |
| 5,807,172 A | 9/1998 | Piechowiak |
| 5,809,303 A | 9/1998 | Senator |
| 5,833,538 A | 11/1998 | Weiss |
| 5,839,958 A | 11/1998 | Ozarow |
| 5,848,932 A | 12/1998 | Adams |
| 5,854,927 A | 12/1998 | Gelissen |
| 5,876,284 A | 3/1999 | Acres et al. |
| 5,880,386 A | 3/1999 | Wachi et al. |
| 5,889,990 A | 3/1999 | Coleman |
| 5,892,171 A | 4/1999 | Ide |
| 5,902,184 A | 5/1999 | Bennett et al. |
| 5,908,354 A | 6/1999 | Okuniewicz |
| 5,910,048 A | 6/1999 | Feinberg |
| 5,911,071 A | 6/1999 | Jordan |
| 5,920,720 A | 7/1999 | Toutonghi |
| 5,923,878 A | 7/1999 | Marsland |
| 5,923,880 A | 7/1999 | Rose |
| 5,930,509 A | 7/1999 | Yates |
| 5,937,193 A | 8/1999 | Evoy |
| 5,946,487 A | 8/1999 | Dangelo |
| 5,946,489 A | 8/1999 | Yellin |
| 5,964,843 A | 10/1999 | Eisler |
| 5,966,535 A | 10/1999 | Benedikt |
| 5,967,894 A | 10/1999 | Kinoshita et al. |
| 5,970,249 A | 10/1999 | Holze |
| 5,971,271 A | 10/1999 | Wynn et al. |
| 5,978,585 A | 11/1999 | Crelier |
| 5,997,401 A | 12/1999 | Crawford |
| 5,999,731 A | 12/1999 | Yellin |
| 6,003,038 A | 12/1999 | Chen |
| 6,015,346 A | 1/2000 | Bennett |
| D421,277 S | 2/2000 | McGahn et al. |
| 6,021,272 A | 2/2000 | Cahill |
| 6,021,273 A | 2/2000 | Criesemer |
| 6,026,238 A | 2/2000 | Bond |
| 6,029,000 A | 2/2000 | Woosley |
| 6,031,993 A | 2/2000 | Andrews |
| 6,035,120 A | 3/2000 | Ravichandran |
| 6,056,642 A | 5/2000 | Bennett |
| 6,062,979 A | 5/2000 | Inoue |
| 6,066,181 A | 5/2000 | DeMaster |
| 6,071,192 A | 6/2000 | Weiss |
| 6,074,432 A | 6/2000 | Guccione |
| 6,075,940 A | 6/2000 | Gosling |
| 6,084,169 A | 7/2000 | Hasegawa et al. |
| 6,089,976 A | 7/2000 | Schneider et al. |
| 6,089,978 A | 7/2000 | Adams |
| 6,092,147 A | 7/2000 | Levy |
| 6,096,095 A | 8/2000 | Halstead |
| 6,102,400 A | 8/2000 | Scott et al. |
| 6,106,393 A | 8/2000 | Sunaga et al. |
| 6,110,041 A | 8/2000 | Walker et al. |
| 6,110,043 A | 8/2000 | Olsen |
| 6,110,226 A | 8/2000 | Bothner |
| 6,113,495 A | 9/2000 | Walker et al. |
| 6,117,009 A | 9/2000 | Yoseloff |
| 6,126,165 A | 10/2000 | Sakamoto |
| 6,131,191 A | 10/2000 | Cierniak |
| 6,138,273 A | 10/2000 | Sturges |
| 6,141,794 A | 10/2000 | Dice |
| 6,142,875 A | 11/2000 | Kodachi et al. |
| 6,146,273 A | 11/2000 | Olsen |
| 6,146,276 A | 11/2000 | Okuniewicz |
| 6,155,925 A | 12/2000 | Giobbi et al. |
| 6,159,097 A | 12/2000 | Gura |
| 6,174,233 B1 | 1/2001 | Sunaga et al. |
| 6,174,235 B1 | 1/2001 | Walker et al. |
| 6,175,632 B1 | 1/2001 | Marx |
| 6,198,395 B1 | 3/2001 | Sussman |
| 6,217,448 B1 | 4/2001 | Olsen |
| 6,238,288 B1 | 5/2001 | Walker et al. |
| 6,241,612 B1 | 6/2001 | Heredia |
| 6,254,481 B1 | 7/2001 | Jaffe |
| 6,270,411 B1 | 8/2001 | Gura et al. |
| 6,293,869 B1 | 9/2001 | Kwan et al. |
| 6,302,790 B1 | 10/2001 | Brossard |
| 6,306,034 B1 | 10/2001 | Sakamoto et al. |
| 6,309,299 B1 | 10/2001 | Weiss |
| 6,309,301 B1 | 10/2001 | Sano |
| 6,311,982 B1 | 11/2001 | Lebensfeld et al. |
| 6,328,648 B1 | 12/2001 | Walker et al. |
| 6,390,923 B1 | 5/2002 | Yoshitomi et al. |
| 6,409,596 B1 | 6/2002 | Hayashida et al. |
| 6,416,411 B1 | 7/2002 | Tsukahara |
| 6,516,466 B1 | 2/2003 | Jackson |
| 6,537,152 B2 | 3/2003 | Seelig et al. |
| 6,544,122 B2 | 4/2003 | Araki et al. |
| 6,554,703 B1 | 4/2003 | Bussick et al. |
| 6,561,908 B1 | 5/2003 | Hoke |
| 6,599,195 B1 | 7/2003 | Araki et al. |
| 6,638,169 B2 | 10/2003 | Wilder et al. |
| 2002/0077165 A1 | 6/2002 | Bansemer et al. |
| 2003/0064798 A1 | 4/2003 | Grauzer et al. |
| 2003/0073490 A1 | 4/2003 | Hecht et al. |
| 2003/0227473 A1 | 12/2003 | Shih et al. |
| 2005/0164786 A1 | 7/2005 | Connelly |
| 2005/0261063 A1* | 11/2005 | Boyd ............... H04L 67/125 463/42 |
| 2006/0068909 A1 | 3/2006 | Pryzby et al. |
| 2006/0079213 A1 | 4/2006 | Herberger et al. |
| 2007/0032281 A1 | 2/2007 | Nakatsuka et al. |
| 2007/0213134 A1 | 9/2007 | Aida |
| 2009/0194585 A1* | 8/2009 | Blackson ............ G06Q 20/04 235/379 |
| 2010/0103781 A1* | 4/2010 | Rai ................. H04J 3/0667 368/55 |
| 2010/0273555 A1 | 10/2010 | Beerhorst |
| 2011/0179943 A1 | 7/2011 | Bowen |
| 2012/0214594 A1 | 8/2012 | Kirovski et al. |
| 2013/0310163 A1 | 11/2013 | Smith et al. |

(56) References Cited

U.S. PATENT DOCUMENTS

2014/0128160 A1    5/2014  Gillet et al.
2014/0206432 A1*  7/2014  Radek ................. G07F 17/3223
                                                        463/25
2015/0371486 A1*  12/2015  Castro ................. G07F 17/3211
                                                        463/31

FOREIGN PATENT DOCUMENTS

| JP | 11216221 | 8/1999 |
|----|----------|--------|
| JP | 02000296209 | 10/2000 |

\* cited by examiner

TIME SYNCHRONIZATION OF GAMING MACHINES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD OF THE INVENTION

This application relates to electronic gaming machines, and more particularly to synchronizing light and sound performances across adjacent gaming machines.

BACKGROUND

Electronic gaming machines ("EGMs"), otherwise known as slot machines, can be found in casinos throughout the world. EGMs accept wagers from players in exchange for the opportunity to win cash prizes. This opportunity to win is provided in conjunction with the play of an entertaining wagering game. The game is typically displayed on either a display screen or in conjunction with physical devices, such as reels, which indicate the game outcome.

Modern EGMs are equipped with several dozen, if not hundreds of individually controllable multicolor light devices, such as light emitting diodes (LEDs). These LEDs are often grouped together to form light bars which are molded into various areas of a housing of the EGM. The LEDs are controlled by a light controller to produce predefined light sequences in response to predefined events. The light controller can be instructed to perform light shows that correspond to various game outcomes or which correspond to an attract sequence designed to entice players to play the game on the EGM.

Modern EGMs also commonly have a speaker system designed to reproduce high quality music, voice and sound effects. The speaker system is typically connected to an audio processing device that is in communication with a central processor of the EGM. The audio processing device accesses audio files loaded into a main memory of the EGM to play sound through the speaker system. Sound is played through the speaker system in conjunction with the play of a game or an attract sequence.

Casinos arrange EGMs in banks, in which several EGMs are positioned side by side facing the same direction. Banks of EGMs which are endowed with light bars and speaker systems present an opportunity to perform banked light and sound shows. A banked light and sound show is a predefined collection of time synchronized light and sound sequences that specific EGMs within the bank perform in a synchronized manner. A synchronized banked light and sound show generally involves each EGM performing the exact same light and sound performance at the same time. However, a banked light and sound show may also involve some EGMs performing light or sound performances that are partially different from those performed by other EGMs in the bank to create an intended effect.

A banked light and sound show should be performed in such a manner as to avoid the perception by an observer that the performances of the individual EGMs are not synchronized. Banked light and sound shows that are unsynchronized can be distracting at best and annoying at worse, especially if the sound is so unsynchronized as to be discordant. Regardless of the degree of unsynchronization, a perceptibly unsynchronized banked light and sound show can leave an observer with the impression that EGM manufacturers have released an unpolished product or that the casino lacks high standards for the entertainment it provides.

These and other considerations have led to the evolution of the present disclosure.

SUMMARY

The present application discloses useful techniques for synchronizing light and sound shows among banked EGMs. These techniques enable for the synchronized performance of light and sound shows on banked EGMs even if the clocks of the EGMs are not all synchronized. Additional advantages of the disclosures described herein include facilitating the relatively speedy execution of automatically scheduled light and sound shows, reducing the chance that an EGM will not be ready to execute an light and sound show at the scheduled time, and minimizing the chance that a player playing on an EGM will mistake an light and sound show for a game triggered event.

One aspect of the disclosure involves an electronic gaming machine which sends a query through a network interface to a time server for the current time. The electronic gaming machine receives a response through the network interface from the time server indicating the current time. The electronic gaming machine determines the time difference between a local clock and the indicated current time. The electronic game machine receives a request through the network interface to activate the light devices and the at least one speaker at a future time. The electronic gaming machine determines a scheduled time based on both the future time and the time difference, schedules the activation to occur at the scheduled time, and activates the light devices and the at least one speaker at the scheduled time.

Another aspect of the disclosure involves an electronic gaming machine having a first group of light devices determined to be within a viewing area of a player when the player is playing a wagering game on the electronic gaming machine and a second group of light devices determined not to be within the viewing area of the player when the player is playing the wagering game. The electronic gaming machine determines whether a player is detected at the electronic gaming machine, and if so, activates the first group of light devices at a scheduled time for activating the light devices only if a player is determined to not be using the electronic gaming machine.

Another aspect of the disclosure involves the electronic gaming machine determining whether content files for a scheduled activation of the light devices and speaker are stored on a data storage device of the electronic gaming machine. If the content files are determined not to be stored on the data storage device, the electronic gaming machine sends a request for the content files to a content host through a network interface. The electronic gaming machine receives any content files requested and stores the content files on a data storage device.

Additional aspects and a more complete appreciation of the present disclosure can be obtained from the following detailed description and the claims.

BRIEF DESCRIPTION OF THE DRAWINGS

The details of one or more implementations are set forth in the accompanying drawings and the description below.

Other features, aspects, and advantages of the disclosure will become apparent from the descriptions, the drawings, and the claims, in which:

DETAILED DESCRIPTION

Figure 1:
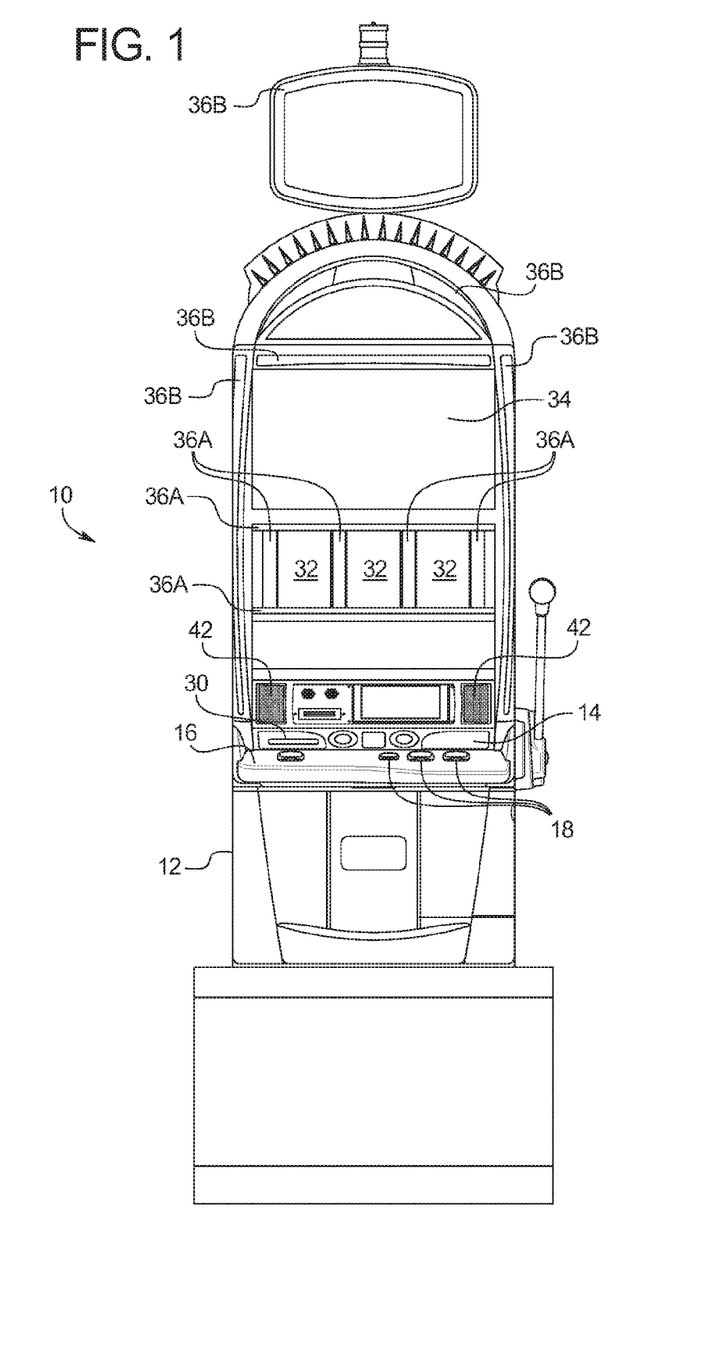
FIG. 1 is a front view of an EGM in which various embodiments of the disclosure may be implemented.
Figure 2:
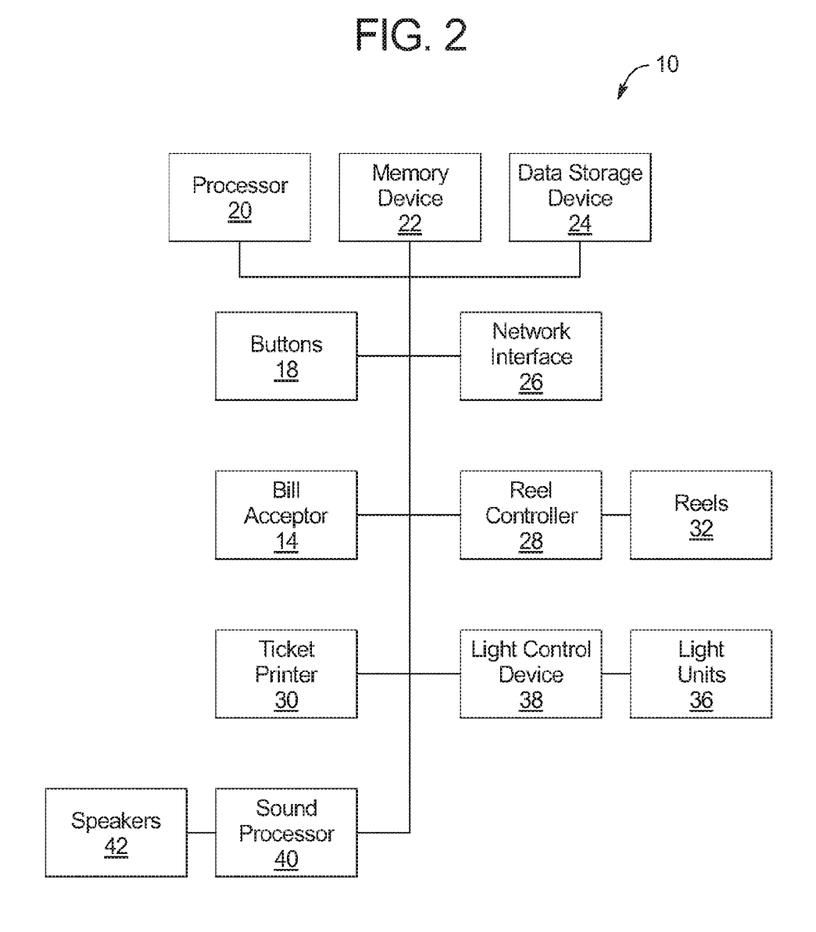
FIG. 2 is a block diagram of the EGM of FIG. 1 according to an exemplary embodiment.

The banked light and sound shows ("L&S shows") of the present disclosure may be implemented on a plurality of electronic gaming machines ("EGMs"), an exemplary one of which is shown as EGM 10 in FIGS. 1 and 2. EGM 10 includes an enclosed cabinet 12 on which is mounted a combined bill and ticket acceptor 14 for receiving cash or ticket vouchers from a player. The EGM 10 converts inserted cash or ticket vouchers into credits usable for a play of the game. The EGM 10 also includes a button panel 16 which contains a plurality of push buttons 18 for communicating player choices to the EGM 10. The push buttons 18 typically have different and specific functions which may include: selecting one of a preselected number of credits to bet per payline; selecting one of a preselected number of paylines to bet per game; selecting to play the maximum number of credits; initiating play of the game; or cashing out.

An EGM processor 20 is communicatively coupled to the bill and ticket acceptor 14 and the push buttons 18. The EGM processor 20 is also communicatively coupled to a memory device 22, a persistent data storage device 24 a network interface 26, a reel controller 28, and a ticket printer 30. The data storage device 24 contains an operating system and game code which the EGM processor 20 loads into memory 22 and executes to control the operation of the game and the functionality of the EGM 10. The EGM processor 20 communicates with other devices or computers over a network through the network interface 26 for various purposes. The reel controller 28 is connected to and controls a plurality of stepper motors. Mounted to a separate one of each stepper motor is a physical reel 32. The reel controller 28 is operable to cause the stepper motors to activate, causing rotation of the physical reels 32. Each physical reel 32 has a plurality of different symbols (not shown) formed on its circumferential periphery. The ticket printer 30 prints a ticket voucher having a cash value corresponding to the number of credits attributed to the player when the cash out button is pressed.

Upon the initiation of a play of the game, the EGM processor 20 is operable to: deduct the wager amount from the player's available credits; randomly determine an outcome for the game; issue commands to the reel controller 28 which cause the reels 32 to commence spinning and then stop to indicate the outcome of the game, and to award the player any credits associated with a winning outcome. The alignment of a winning combination of symbols on one or more paylines indicates a win of the game. The paylines are typically permanently formed into a display glass positioned in front of the reels 32 but may also be indicated by other means, such as through a transparent display screen positioned in front of the reels, or by selectively lighting the symbols of winning combinations in sequence. A display screen 34 is attached to the cabinet 12 and positioned above the reels 32. The EGM processor 20 may use the display screen 34 for various purposes, such as displaying a bonus game, displaying a pay table for the game, and displaying images or videos while either in attract mode or as part of a L&S show.

A plurality of light units 36 are formed on the cabinet 12. The light units 36 may each contain one or several individually controllable light sources, such as colored LEDs. The light units 36 are connected to a light control device 38. The light control device 38 is communicatively coupled to the EGM processor 20. The light control device 38 receives commands from the EGM processor 20 to activate one or more light units 36 in a specific manner. The light control device 38 lights the light units 36 in accordance with the specific commands received from the EGM processor 20. The light control device 38 may be pre-programmed to activate the light units 36 in predefined ways in response to different predefined commands in order to relieve the EGM processor 20 from having to individually control every light source on the EGM 10. Additionally, the light control device 38 may receive from the processor 20 or through a communication link to the memory 22, a light control file that instructs the light control device 38 to perform a light show. The light control file typically includes instructions for lighting specific light units 36 at specific colors for specific durations at specific times. Such light control files may be custom tailored for the particular EGM platform, to take full advantage of the lighting capabilities of the platform, or may be generic and usable by multiple EGM platforms.

The light units 36 may be classified according to whether or not the participation of the particular light unit 36 in a L&S show would distract or confuse a player who is playing a game. A player is likely to not be amused if he initially mistakes an L&S show for a winning outcome on the game he is playing. Light units 36 that would likely be distracting are those in the viewing area in front of the player, such as the light units 36A in between and around the reels 32. Light units 36 that would be unlikely to be distracting are those that are not in the viewing area in front of the player, such as the light units 36B formed in the front corners of the cabinet 12. The EGM processor 20 may indicate to the light control device 38 whether or not a player is at the EGM 10 (for example, as indicated by a non-zero credit balance or a game currently in play). The light control device 38 may automatically exclude light units 36A from an L&S show when a player has been detected at the EGM 10, and may automatically include light units 36A in the L&S show when a player has not been detected at the EGM 10.

Also contained within the cabinet 12 is a sound processor 40. The sound processor 40 is coupled to the EGM processor 20, the memory 22 and one or more pairs of speakers 42. The sound processor 40 plays sound, for example, a song, through the speakers 42 by processing a sound file. For typical sound play, the EGM processor 20 loads the desired sound file into memory 22 and instructs the sound processor 40 to load and play the sound file. A particular sound file may be associated with a particular light control file, with both intended to be executed at the exact same time. This is typically the case for an L&S show. The memory 22 and the data storage device 24 are part of a memory hierarchy typical of computer systems in which operations with the memory 22 are much faster than with the data storage device 24, which is rather slow in comparison. To ensure that any latency of the data storage device 24 does not result in the light and sound parts of a L&S show being initiated at different times, both the light control file and the sound file may be pre-loaded into the memory 22 several seconds in advance prior to the planned initiation of the L&S show on the EGM 10.

Figure 3:
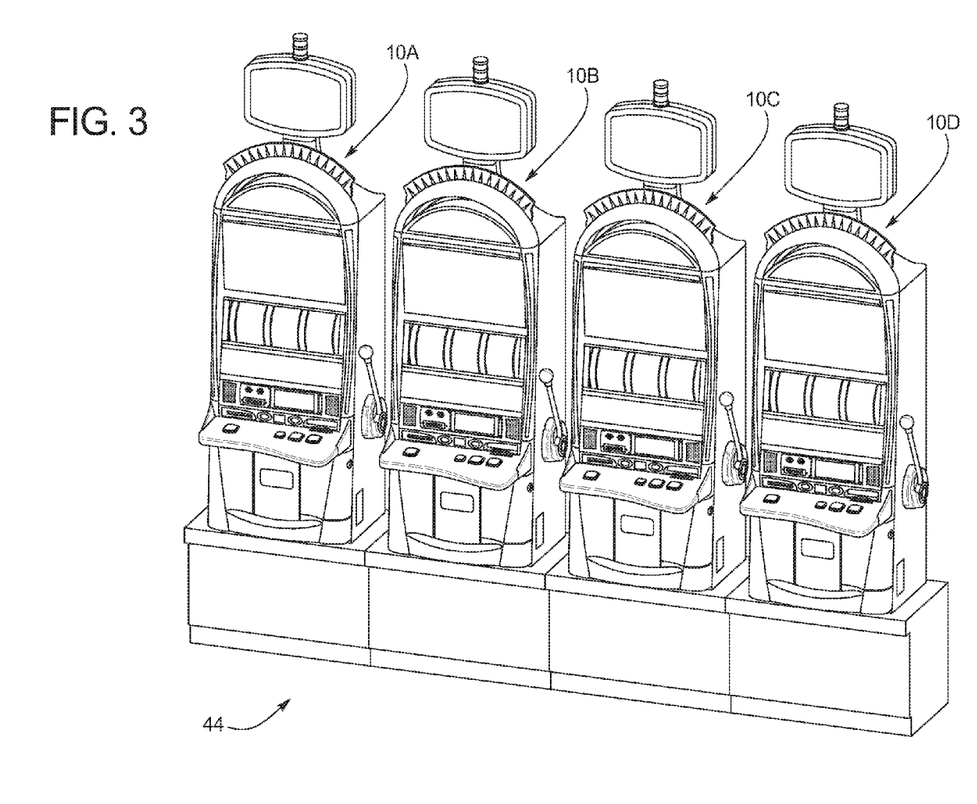
FIG. 3 is a perspective view of a bank of EGMs, such as the one shown in FIG. 1.
Figure 4:
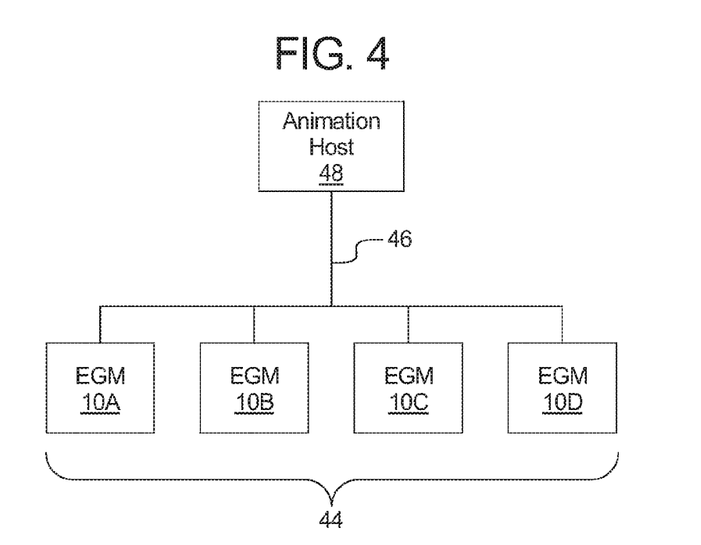
FIG. 4 is a block diagram of the bank of EGMs shown in FIG. 3 connected to an animation host.

A bank 44 of EGMs 10A-10D which implement an embodiment of the disclosure is shown in FIGS. 3 and 4. The EGMs 10 are connected over a network 46 to an animation host 48. The animation host 48 communicates with the EGMs 10 to provide the EGMs with L&S show content and to schedule L&S shows. The animation host 48 may store the content files for several different L&S shows. In certain embodiments, the animation host 48 enables an administrator to schedule a particular L&S show to trigger on a specific grouping of EGMs 10, such as bank 44, at a specific time in the future. Various embodiments of the animation host 48 may enable for associating a particular L&S show with a specific grouping of EGMs 10 (an "L&S show association"). Such an L&S show association may be then be scheduled to occur at multiple different times in the future without the need to re-associate the particular L&S show with the same particular EGMs.

An L&S show association typically involves the same concurrent performance of light and sound on the EGMs that are grouped within the association. However, an L&S show or L&S show association may also be EGM location aware. For example, an L&S show association that is EGM location aware may have a particular light or sound performance occur on the grouped EGMs in a specific order. This ordered performance could, for example, display a light performance that starts at one EGM at the end of a bank and is then displayed on the adjacent EGM and so on, until it is displayed at the EGM at the other end of the bank. An ordered performance such as this may be combined with a concurrent performance in a single L&S show association. The locations of the EGMs referred to herein are most conveniently defined as relative locations, such as a simple number assignment from one to eight for a bank of eight EGMs, which is useful to determine the EGMs on the end of the banks (those having the highest and lowest number assignment) as well as to determine whether two EGMs are adjacent (those having number assignments that differ by one). Other techniques for determining relative EGM location, such as grid location on a two-dimensional plot, could also be utilized.

In certain embodiments, the animation host 48 enables an administrator to schedule an L&S show to be performed on a periodic basis. Such L&S shows could be designed to entice players to play the games on the EGMs of the show. This type of show is in effect a banked attract L&S show and may be more effective than the attract mode of a single EGM. Banked attract L&S shows that are frequently scheduled may produce sound for only a small portion of the show, or even not all, to reduce both excess noise in the casino and power consumption.

In addition to enabling an administrator to schedule an L&S show, embodiments of the animation host 48 may include provisions for the automatic scheduling of an L&S show upon the occurrence of some predefined event. For example, a celebratory win L&S show could be triggered when one of the EGMs in a bank awards a large jackpot. The animation host 48 may receive an indication that the large jackpot was awarded, from either the EGM that awarded the award or from some server in the casino environment that is aware that the award was just awarded. The animation host 48 may then determine the nearby EGMs to the one that issued the award, from the relative location information, and put together a spontaneous L&S show association of the award EGM and the nearby EGMs involving an upbeat celebration oriented L&S show. The animation host 48 could then immediately schedule the L&S show to occur as soon as possible.

The animation host 48 may associate relative priority levels to various L&S shows, to enable the EGMs to perform the higher priority L&S show in the event of a scheduling conflict. For example, a casino operator might prefer to have a celebratory win L&S show interrupt a previously scheduled attract L&S show.

Another example of a spontaneous automatic scheduling of an L&S show could be when a particular bank of EGMs is determined to be on a payout streak (hot) or a stingy streak (cold). The animation host 48 could then play an appropriate 'hot' (for example, with red, orange and yellow lights, a video of a fire, and fire crackling noises) or 'cold' (for example, with white and blue lights, a video of a blizzard, and howling wind and cracking ice noises) L&S show on the bank.

In certain embodiments, the animation host 48 would have access to as much data and statistics regarding the EGMs as would be needed to define as many different triggers for automatic L&S shows as is desired. Other data not directly related to play on an EGM may also be used as a trigger for an L&S show, such as motion detectors which could prompt the animation host 48 to initiate an L&S show on a bank of EGMs near where motion (a person) was detected. Motion detection could be facilitated through use of a camera on the EGM facing outward towards the area in front of the EGM. Such cameras are commonly being incorporated into modern EGMs.

The act of scheduling a specific L&S show to occur on specific EGMs at a specific time involves communicating instructions to those EGMs that they are to perform the specific L&S show at the specific time. Upon receipt of the scheduling instructions, each EGM in the show determines whether or not it has the required content files for the L&S show or if it needs to download them from somewhere. If the EGMs need to download the content files for the scheduled L&S show, the EGM downloads them from a server on the network, such as the animation host 48, which hosts the content files. The EGMs in the scheduled L&S show load the content files into memory some time in advance (for example, 5-10 seconds) of the scheduled start time for the L&S show. As previously mentioned, loading the content files in advance of the start time of the L&S show helps to avoid any one of the EGMs in the show from starting late due to latency of the data storage device of the EGM.

It is desirable to initiate some automatically scheduled L&S shows as quickly as possible in order for the L&S show to be performed as contemporaneously as possible with the event that initiated the scheduling, such as the celebratory win L&S show. If each EGM of the celebratory win L&S show had to download the file content for the L&S show when the EGMs received instructions to schedule the show, the celebratory win L&S show would be delayed by at least as much time as it takes the EGMs to download the content files and then load them into memory. If this delay lasts several seconds, the celebratory L&S show will seem late with respect to the occurrence of the win. Therefore, it may be desirable to allocate some amount of the permanent storage space on the data storage device of the EGMs for the content files for some L&S shows to avoid this delay. To even further reduce delay, some content files could be permanently loaded into memory of the EGMs to enable for almost instantaneous initiation of an L&S show. In certain embodiments, the animation host 48 has the capability of instructing EGMs of an L&S show association to either download content files for a specific L&S show or to load those content files into memory, independently of a scheduling instruction. After affording the EGMs time to act on such loading instructions (or after an acknowledgement from the EGMs), the animation host 48 would have assurance, or 'knowledge' that the content files have been downloaded or loaded into memory. If the animation host 48 has 'knowledge' that the EGMs of an L&S show association already have needed content files for the L&S show, the animation host 48 could schedule the L&S show to occur sooner in the future than it otherwise could without that knowledge, for a particular degree of confidence that all of the EGMs of the L&S show will successfully perform the show at the scheduled time. Likewise, if the animation host 48 has 'knowledge' that the EGMs of an L&S show association have already loaded the needed content files into memory, the animation host 48 could schedule the L&S show to occur even sooner in the future than it could with the 'knowledge' that content files are merely on the data storage devices of the EGM.

It should be appreciated that the L&S show of certain embodiments initiates on the EGMs of the show at close to the same time to prevent the L&S show from appearing to be unsynchronized to an observer. Generally, so long as the L&S show is initiated on a bank of EGMs of the show within around 100 ms of each other, a casual observer will not notice that the light portion of the L&S show is not perfectly synchronized. However, human perception of unsynchronized sound is sharper, and the EGMs of an L&S show should be synchronized to initiate the L&S show within 30-35 ms of each other to avoid the perception of an observer that the sound from the L&S show is unsynchronized.

To ensure accurate accounting and for other purposes, the main clock of each EGM in a casino is usually synchronized to some time source, so that at least some grouping of EGMs in the casino, if not all of them, are time synchronized to some degree. The common method of synchronizing the time of EGMs in a casino environment is through either the Slot Accounting Service (SAS) protocol or the Network Time Protocol (NTP). However, despite the use of a time synchronization protocol on all of the EGMs in a particular group, those EGMs could still have main clocks that are out sync with each other by more than 30-35 ms (between the fastest and slowest clocks) for various reasons. Among these reasons are: (1) the potential use of multiple or different time servers in the casino environment each having a different reference clock time; (2) a high degree of time drift of an individual EGM; (3) time protocol settings that are loose enough for the EGMs to not always be sync'd within 30-35 ms; and (4) a particular EGM that is in the slow process of having its clock 'corrected' over a long period of time, as NTP may enable to avoid an instant change in a clock that is drastically different from the reference time. For at least these reasons, an L&S show that relies on scheduling based directly on the clock times of EGMs in a typical casino environment is susceptible to appearing unsynchronized.

To overcome certain problems of performing an L&S show on EGMs that have clocks which are out of sync, an embodiment of the present disclosure utilizes a modified NTP client on each EGM. The modified NTP client does not change or update the actual clock on the EGM. Instead, the modified NTP client maintains an offset which indicates the difference in time between the EGM clock and the clock of a designated reference time source. A convenient designated reference time source is the clock of the animation host 48. The animation host 48 is assumed to be the designated reference time source in the discussion below.

The animation host 48 executes an NTP server program which provides a reference time to each of the EGMs that are configured to participate in an L&S show. Each of the EGMs executes the modified NTP client. The modified NTP client obtains the current reference time from the animation host 48 on a periodic basis, such as every 15 seconds, or on an as needed basis, such as upon receipt of instructions by the EGM to schedule an L&S show. Upon receiving the current reference time, the modified NTP client compares the reference time to the EGM clock and records the time difference or offset. The time difference may be calculated, for example, as the reference time minus the EGM clock time after accounting for the impact of network latency. Network latency can be accounted for in various ways known in the computer arts. In certain embodiments, the time difference is accurate to at least the millisecond level.

When an EGM 10 receives instructions from the animation host 48 to schedule an L&S show at a specific time, the EGM 10 schedules the show to initiate at a time equal to the scheduled start time plus the recorded offset. In embodiments in which the modified NTP client updates the offset on a periodic basis, the EGM 10 may also check to see if the offset has changed, and if so reschedule the L&S show to reflect the updated offset. Scheduling the L&S shows in this manner on different EGMs that likely have different recorded offsets helps ensure that the L&S shows are initiated with a high degree of synchronizational accuracy. This offset technique is facilitated by EGMs that are capable of scheduling events to the millisecond level. EGMs that can only schedule events down to the second level, or minute level can still make use of the offset technique by scheduling a script to execute at the closest earliest schedulable time and having the script wait the appropriate number of milliseconds before initiating the L&S show.

If the content files for a scheduled L&S show are not ready and loaded into memory already when the scheduled time to perform the L&S show arrives, in certain embodiments, the EGM abstains from performing the L&S show to avoid performing out of sync with the other EGMs in the show, and informs the animation host 48 that the EGM was not able to perform the L&S show on time.

In one embodiment, the L&S show is scheduled by the EGM by the EGM scheduling the content files to execute. The content files may be executable themselves or may be associated with media program that executes using the content files as data. In the event that the content files are not already loaded into memory when the scheduled time arrives, the files will be loaded into memory upon their execution or use by the media program. In this embodiment, the executable content files or the media program do not themselves check to determine if the content files have been pre-loaded into memory. Therefore, in this embodiment, the EGM loads the content files into memory immediately upon receiving a request to schedule the L&S show, checks to ensure that the requested scheduled time has not already passed, and if not proceeds to schedule the L&S show at the scheduled time. This technique avoids the possibility of a delay in the start of the L&S show that could be caused by the EGM loading the content files into memory when the scheduled time arrives. If the scheduled time is far enough into the future, it may be undesirable to immediately load the content files into memory and to keep that memory blocked from other uses for a prolonged period of time. Thus, when the EGM receives a schedule request that is far enough into the future, the EGM may schedule the preloading of the content files into memory to occur a brief period of time in advance (for example, 5-10 seconds) ahead of the requested schedule time for the L&S show.

In another embodiment, the L&S show performance on an EGM is managed by a manager program executing on the EGMs. The manager program may be set to execute as a background process. The manager program may also include its own scheduling capability. The manager program is ideally capable of receiving the requests to schedule the L&S show (for example, by listening on a network port allocated for that purpose) and automatically preloads the associated content files a brief period of time in advance of the requested time to schedule the L&S show, and then executes the L&S show at the requested scheduled time. A manager program that performs the L&S show scheduling would utilize the offset record created by the modified NTP client. In some embodiments, the modified NTP client code may be incorporated into the manager program. The manager program could also prevent the light units 36A in the reel area from being used in an L&S show while a player is playing on the EGM. The manger program could also be responsible for scheduling traditional single EGM attract sequences. Ideally, an L&S show will have a higher priority than a standalone EGM attract sequence, in which case the manager program will enable a scheduled L&S show to interrupt an in progress standalone EGM attract sequence.

Figure 5:
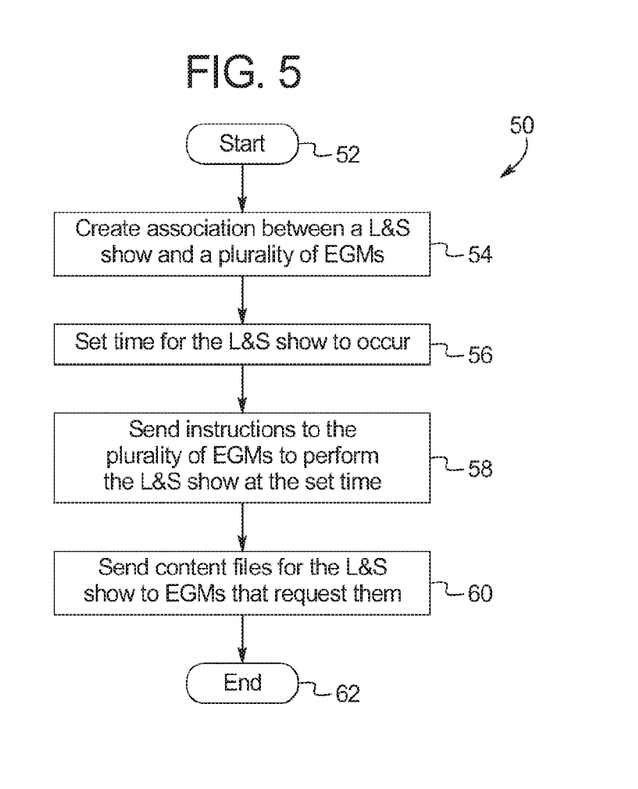
FIG. 5 is a flow chart showing a method performable by the animation host of FIG. 4 in an embodiment of the disclosure.

A method 50 which an animation host can execute in an embodiment of the disclosure is shown in FIG. 5. The method 50 starts at 52. At 54, the animation host enables an administrator to create an association between an L&S show and a plurality of EGMs to create an L&S show association. The animation host then, at 56, enables the administrator to set a time for the L&S show to occur. At 58, the animation host sends instructions to the plurality of EGM's in the L&S show association to perform the L&S show at the set time. The animation host thereafter supplies content files for the L&S show to those EGMs that request the content files, at 60. The method 50 ends at 62.

Figure 6:
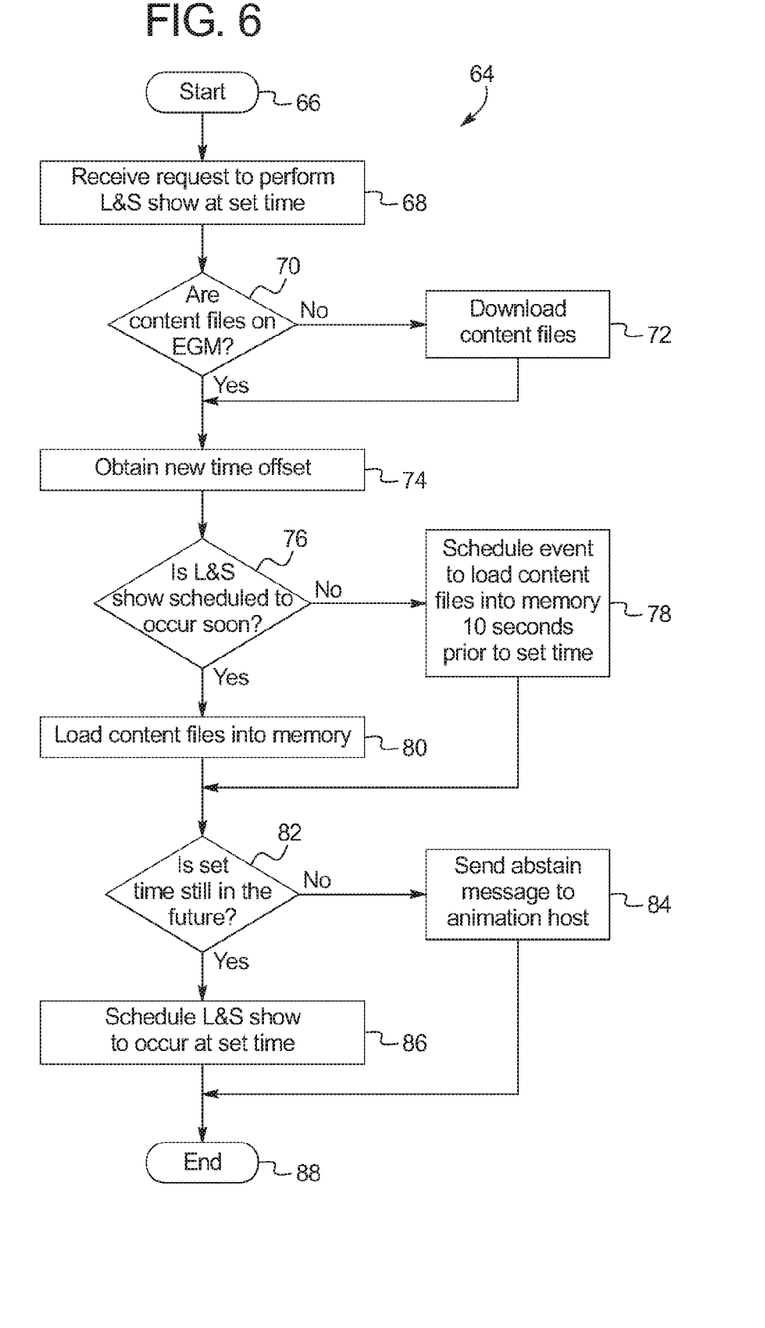
FIG. 6 is a flow chart showing a method performable by an EGM of FIGS. 1-4 in an embodiment of the disclosure.

A method 64 which an EGM (for example, through a manager program) can execute to facilitate performing a L&S show in an embodiment of the disclosure is shown in FIG. 6. The method 64 starts at 66. At 68, the EGM receives a request to perform the L&S show at the set time from the animation host. At 70, the EGM determines whether or not it has the required content files for the L&S show. If the determination at 70 is negative, the EGM downloads the required content files from the animation host, at 72. After 72, or if the determination at 70 is affirmative, the EGM obtains a new time offset through the modified NTP client, at 74. At 76, The EGM determines whether or not the set time for the L&S show is within a predetermined number of seconds (such as ten) into the future. If the determination at 76 is negative, the EGM, at 78, schedules an event to load the content files for the L&S show into memory at a point in time sufficiently in advance of the set time (for example, ten seconds), to ensure that the content files will be in memory by the set time. If the determination at 76 is affirmative, the EGM immediately loads the content files into memory, at 80. After either 78 or 80, the EGM at 82 determines whether or not the set time is still in the future. This determination is to ensure that the set time has not already elapsed. If the determination at 82 is negative, the EGM sends an 'error message' to the animation host indicating that the EGM is abstaining from participating in the L&S show, at 84. If the determination at 82 is affirmative, the EGM, at 86, schedules the L&S show to occur at the set time by scheduling it at the set time plus the offset. After either 84 or 86, the method 64 ends at 88.

The improvements of the present disclosure as described above can significantly reduce the chances that a L&S show will appear to be out of sync to an observer. Various embodiments of the disclosure can also facilitate speedy execution of automatically scheduled L&S shows, reduce the chance that an EGM will not be ready to execute an L&S show at the scheduled time, and minimize the chance that a player playing on an EGM will mistake an L&S show for a game triggered event.

Various server functions previously described, such as those involving the L&S show association creation and scheduling, the NTP server for the modified NTP clients, and the hosting of content files may be hosted by the same or different servers. Although the disclosure has been described with reference to a physical reel EGM, other types of EGMs, such as video EGMs, are contemplated as being equally suitable for use with the disclosure.

Although the disclosure has been described with reference to a bank of EGMs positioned side by side and facing the same direction, any grouping of EGMs in any orientation relative to each other may implement the L&S shows of the disclosure. Likewise, the EGMs that implement L&S shows do not necessarily have to be in proximity to each other, though they typically will be for improved effect.

Various types of light devices besides LEDs may be used in embodiments of the disclosure. Additionally, some embodiments of the disclosure may involve EGMs having groups of light devices that are controllable as a group, as opposed to individually controllable.

Although various protocols have been described in reference to particular embodiments, this should not be construed as requiring the use of a particular protocol, or adherence to the specifications for a particular protocol. For example, the NTP server functionality could be implemented by a compact program with much less functionality than a full featured version of an NTP server.

The embodiments described above included a physical reel EGM. Other types of EGMs besides physical reel EGMs can be utilized just as easily with the disclosure.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, a data processing agent. Alternatively or in addition, the program instructions can be encoded on an artificially-generated propagated signal, e.g., a machine-generated electrical, optical, or electromagnetic signal, that is generated to encode information for transmission to suitable receiver agent for execution by a data processing agent. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing agent on data stored on one or more computer-readable storage devices or received from other sources.

The term "client or "server" include all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and agent can also be implemented as, special purpose logic circuitry, e.g., an FPGA (field programmable gate array) or an ASIC (application specific integrated circuit).

Suitable for the execution of a computer program include, by way of example, both general and special purpose microprocessors, and any one or more processors of any kind of digital computer. Generally, a processor will receive instructions and data from a read-only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

The invention is claimed as follows:

1. An electronic gaming machine comprising:
    a housing;
    a plurality of input devices supported by the housing, said plurality of input devices including:
        (i) an acceptor, and
        (ii) a cashout device;
    at least one processor;
    at least one game outcome display device supported by the housing;
    a plurality of light devices;
    at least one speaker;
    a network interface; and
    at least one memory device which stores:
        (I) a first set of instructions that, when executed by the at least one processor, cause the at least one processor to:
            (a) responsive to a physical item being received via the acceptor, establish a credit balance based, at least in part, on a monetary value associated with the received physical item,
            (b) after receiving an actuation of a wager button, initiate a play of a primary game and decrement the credit balance based on a wager amount,
            (c) cause the at least one game outcome display device to display said play of the primary game including a randomly determined outcome on the at least one game outcome display device;
            (d) responsive to a cashout input being received via the cashout device, cause an initiation of any payout associated with the credit balance;

(II) a second set of instructions that, when executed by the at least one processor responsive to receiving a request through the network interface to activate at least one of the plurality of light devices and the at least one speaker at a future time, cause the at least one processor to:
  (i) send a query through the network interface to a time server for a current time;
  (ii) receive a response through the network interface from the time server indicating the current time;
  (iii) determine a time difference between a local clock and the indicated current time;
  (iv) determine a scheduled time based on both the future time and the time difference;
  (v) schedule the activation to occur at the scheduled time; and
  (vi) at the scheduled time, cause at least one of the plurality of light devices and the at least one speaker to provide an event associated with at least another electronic gaming machine.

2. The electronic gaming machine of claim 1, wherein the determined time difference accounts for network latency between the electronic gaming machine and the time server.

3. The electronic gaming machine of claim 1, wherein the plurality of light devices includes a first group of light devices determined to be within a viewing area of a player when the player is playing the primary game and a second group of light devices determined to not be within the viewing area of the player when the player is playing the primary game, the at least one memory device further containing instructions, which when executed by the at least one processor, cause the at least one processor to:
  (i) determine whether the player is using the electronic gaming machine by determining whether there is at least one of: (a) a positive credit balance or (b) a game currently in play; and
  (ii) when the local time equals the scheduled time, activate the first group of light devices only if the player is determined to not be using the electronic gaming machine.

4. The electronic gaming machine of claim 1, which includes:
  a light control device coupled to the plurality of light devices, the light control device operable to process one of a plurality of content files which cause the plurality of light devices to illuminate in a predetermined manner;
  a sound processor coupled to the at least one speaker; the sound processor operable to process one of a plurality of content files which causes sound to be emitted from the at least one speaker; and wherein scheduling the activation causes both the light control device and the sound processor to process a respective content file.

5. The electronic gaming machine of claim 4, wherein the at least one memory device contains further instructions, which when executed by the at least one processor, cause the at least one processor to:
  (i) determine whether content files for a scheduled activation are stored on the at least one memory device;
  (ii) responsive to a determination that the content files are not stored on the at least one memory device, send a request for the content files through the network interface to a content server; and
  (iii) receive from the content server the content files requested and store the content files on the at least one memory device.

6. The electronic gaming machine of claim 5, wherein the determining of whether the content files for the scheduled activation are stored on the at least one memory device, the sending of the request for the content files, and the receiving from the content server the content files are performed independently of the request to activate the at least one of the plurality of light devices and the at least one speaker at the future time.

7. The electronic gaming machine of claim 5, wherein a remote host instructs the at least one processor to perform the determining of whether the content files for the scheduled activation are stored on the at least one memory device, the sending of the request for the content files, and the receiving from the content server the content files.

8. The electronic gaming machine of claim 4, wherein the at least one memory device contains further instructions, which when executed by the at least one processor, cause the at least one processor to:
  (A) determine whether content files for a scheduled activation are stored in the at least one memory device;
  (B) responsive to a determination that the content files are not stored in the at least one memory device, send a request for the content files through the network interface;
  (C) receive the content files requested and store the content files in the at least one memory device; and
  (D) execute (A) to (C) at least 5 seconds in advance of the scheduled activation time.

9. The electronic gaming machine of claim 8, wherein a remote host instructs the at least one processor to perform (A) to (C).

10. A gaming system comprising:
  a plurality of electronic gaming devices, each of the electronic gaming devices including:
    a housing;
    a plurality of input devices supported by the housing, said plurality of input devices including:
      (i) an acceptor, and
      (ii) a cashout device;
    at least one processor;
    at least one game outcome display device supported by the housing;
    a plurality of light devices;
    at least one speaker;
    a network interface; and
    at least one memory device which stores:
      (I) a first set of instructions that, when executed by the at least one processor, cause the at least one processor to:
        (a) responsive to a physical item being received via the acceptor, establish a credit balance based, at least in part, on a monetary value associated with the received physical item,
        (b) after receiving an actuation of a wager button, initiate a play of a primary game and decrement the credit balance based on a wager amount,
        (c) cause the at least one game outcome display device to display said play of the primary game including a randomly determined outcome on the at least one game outcome display device;
        (d) responsive to a cashout input being received via the cashout device, cause an initiation of any payout associated with the credit balance; and
      (II) a second set of instructions that, when executed by the at least one processor responsive to receiving a request through the network interface to activate at least one of the plurality of light devices and the at least one speaker at a future time, cause the at least one processor to:
(i) send a query through the network interface to a time server for a current time;
(ii) receive a response through the network interface from the time server indicating the current time;
(iii) determine a time difference between a local clock and the indicated current time;
(iv) determine a scheduled time based on both the future time and the time difference;
(v) schedule the activation to occur at the scheduled time; and
(vi) at the scheduled time, cause at least one of the plurality of light devices and the at least one speaker to provide an event associated with at least another one of the electronic gaming devices; and a time server, including:
a processor;
a network interface;
a memory device storing instructions that, when executed by the processor of the time server, cause the processor of the time server to operate with the network interface of the time server to:
(i) receive the query through the network interface of the time server for the current time;
(ii) send the response through the network interface of the time server indicating the current time.

11. The gaming system of claim 10, wherein, with respect to each of the electronic gaming devices, the plurality of light devices includes a first group of light devices determined to be within a viewing area of a player when the player is playing the primary game and a second group of light devices determined to not be within the viewing area of the player when the player is playing the primary game, the at least one memory device further containing instructions, which when executed by the at least one processor, cause the at least one processor to:
(i) determine whether the player is using the electronic gaming device by determining whether there is at least one of: (a) a positive credit balance or (b) a game currently in play; and (ii) when the local time equals the scheduled time, activate the first group of light devices only if the player is determined to not be using the electronic gaming device.

12. The gaming system of claim 10, wherein each of the electronic gaming devices includes:
a light control device coupled to the plurality of light devices, the light control device operable to process one of a plurality of content files which cause the plurality of light devices to illuminate in a predetermined manner; and
a sound processor coupled to the at least one speaker; the sound processor operable to process one of a plurality of content files which causes sound to be emitted from the at least one speaker; and wherein scheduling the activation causes both the at least one of the plurality of light control devices and the sound processor to process a respective content file.

13. The gaming system of claim 12, wherein, with respect to each of the electronic gaming devices, the at least one memory device contains further instructions, which when executed by the at least one processor, cause the at least one processor to:
(i) determine whether content files for a scheduled activation are stored on the at least one memory device;
(ii) responsive to a determination that the content files are not stored on the at least one memory device, send a request for the content files through the network interface; and
(iii) receive the content files requested and store the content files on the at least one memory device;
the gaming system further including a content server, the content server including:
a data storage device, the data storage device storing the content files;
a processor;
a network interface;
a memory storing instructions, which when executed by the processor of the content server, cause the processor of the content server to:
(i) receive a request for content files from an electronic gaming device through the network interface of the content server; and
(ii) send the requested content files through the network interface of the content server to the electronic gaming device that made the request.

* * * * *